United States Patent [19]

Pejas et al.

[11] Patent Number: 4,588,881
[45] Date of Patent: May 13, 1986

[54] SYSTEM FOR MONITORING THE MOVEMENTS OF GOODS INWARDS AND/OR OUTWARDS

[75] Inventors: Wolfram Pejas, Reinheim; Jörg Liehmann, Griesheim; Ulrich Brauch, Reinheim, all of Fed. Rep. of Germany

[73] Assignee: Privates Institut für Physikalisch Technische Auftragsforschung GmbH, Darmstadt, Fed. Rep. of Germany

[21] Appl. No.: 512,614

[22] Filed: Jul. 11, 1983

[30] Foreign Application Priority Data

Jul. 12, 1982 [DE] Fed. Rep. of Germany ....... 3226014

[51] Int. Cl.4 ........................ G06F 15/24; G06F 15/26
[52] U.S. Cl. ..................................... 235/385; 235/472
[58] Field of Search ................................ 235/472, 385

[56] References Cited

U.S. PATENT DOCUMENTS 4,418,277 11/1983 Tremmel .......................... 235/472
4,423,319 12/1983 Jacobsen .......................... 235/472

Primary Examiner—Harold I. Pitts
Attorney, Agent, or Firm—Michael J. Striker

[57] ABSTRACT

The invention concerns a system for monitoring the movement of goods inwards and/or outwards with the aid of characteristic markings, such as a bar code which is scanned by a reading pen. Each reading pen is connected by a terminal which has a display and keys for giving special signals by flexible connecting wires. Each terminal is connected via an infrared beam with a so-called converter and this is connected via connecting wires with a control center and a processor as well as a memory. The reading pen contains no electronic components, as small proportion of these are contained in the terminal while the by far greater proportion is contained in the control center with the related processor and memory.

The signals from the reading pen transmitted to the control center and passed on to the processor and memory are also transmitted back to the terminal concerned where they appear in a display so that the person operating the lightweight reading pen can check them. By pressing individual keys on the terminal, particular data stored in the control center or the memory such as prices or stock levels can be retrieved and shown in the display of a terminal.

3 Claims, 1 Drawing Figure

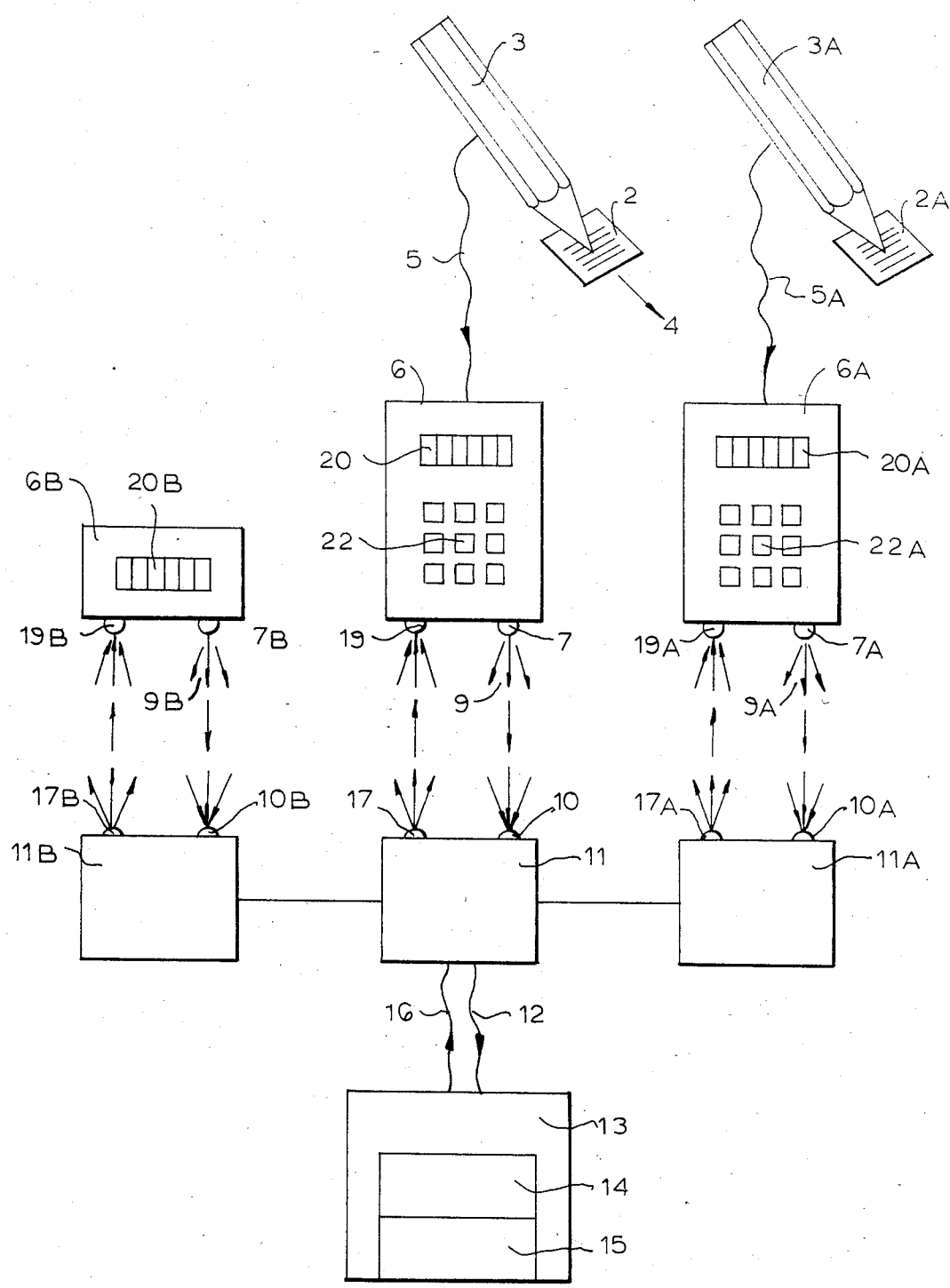

SYSTEM FOR MONITORING THE MOVEMENTS OF GOODS INWARDS AND/OR OUTWARDS

BACKGROUND OF THE INVENTION

The invention concerns a system for monitoring the movement of goods inwards and/or outwards. Numerous systems of this type are already known, for example that described in German Offenlegungsschrift No. 19 50 146. There is described a system for monitoring the movements of goods inwards and/or outwards using a reading pen for scanning a marking such as a bar code characterizing an item of goods and transmitting first electrical signals corresponding to the bar code, to a terminal for processing said electrical signals and for showing data corresponding to the electrical signals in a display for checking purposes and comprising a control centre with a memory.

SUMMARY OF THE INVENTION

It is the general object of the invention to modify the existing system for monitoring the movements of goods inwards and/or outwards such as to ensure high operational reliability, ease of maintenance and ease of operation. This is achieved according with the invention in a system for monitoring the movements of goods inwards and/or outwards using a reading pen for scanning a marking such as a bar code characterizing an item of goods and transmitting first electrical signals corresponding to the bar code, comprising in combination a portable terminal for processing the first electrical signals and also showing data corresponding to the electrical signals in a display for checking purposes and a control centre with a memory, said terminal incorporating an integrated infrared transmitter in which the first electrical signals are modulated onto a carrier wave and transmitted as infrared signals, and a converter with an infrared receiver adapted for converting the infrared signals into second electrical signals.

In accordance with the invention the system comprises also means for transmitting said second electrical signals to the control centre via connecting wires, means for returning said second electrical signals via connecting wires to the converter and from there via an infrared beam to the display of the terminal, means for storing said second electrical signals in areas of the memory reserved for the code of said item, keys being provided at the terminal which when pressed give special signals via the infrared beam and the converter to said control centre, so that upon information (e.g. price of the item, storage location, stock level) relating to the last code read, being stored in the memory is transmitted as additional signals via the infrared beam and the converter to the terminal where it is displayed, and means to send from the control centre repeated information retrieval signals to each of the terminals upon which it is in the receiving mode for the signals sent by the terminal concerned via the infrared beam concerned for a time of a fraction of a second in each case.

In a preferred embodiment the control centre gives a warning signal when stocks of an item fall below a minimum level and also sends the information retrieval signal to an additional terminal for the purpose of showing data in a display.

The novel features which are considered as characteristic for the invention are set forth in particular in the appended claims. The invention itself, however, both as to its system and its method of operation, together with additional objects and advantages thereof, will be best understood from the following description of specific embodiments when read in connection with the accompanying drawing which is in a simplified diametrical form.

BRIEF DESCRIPTION OF THE DRAWING

The FIGURE is a block diagram of the preferred system according to the invention, showing the essential parts and their connection as the way and directions of the electrical signals are indicated by arrows.

DESCRIPTION OF THE PREFERRED EMBODIMENTS

In the FIGURE the item whose release or delivery is to be registered is marked by a bar code 2, which is usually attached directly to the item or its packaging, in exceptional cases to an accompanying document.

The bar code is scanned in the normal way with a reading pen 3 in the direction of the arrow 4. The reading pen emits a light signal which is reflected by the bar code 2 and the electrical signals produced by connecting wires 5 to a terminal 6. The terminal contains an infrared transmitter 7 which modulates a carrier wave with the signals received via the connecting wires 5. The infrared transmitter 7 transmits infrared signals in the direction of the arrows 9, which are received by an infrared receiver 10 which is attached to or integrated with a converter 11. When installing or arranging the converter 11 or several such similar converters, it must be ensured that these are able to receive the infrared beams transmitted by the infrared transmitter 7 of the terminal 6 clearly.

In the converter 11 the infrared signals are converted to electrical signals and these are passed on via the connecting wires 12 to the control centre 13.

These signals are transmitted to a processor 14 within the control centre 13 and to a memory 15 serving the processor. The signals obtained by scanning the bar code 2 on an item of goods are stored in an area of the memory 15 reserved for this type of goods. Simultaneously the office sends out the signals received via the connecting wires 16 to the converter 11 and these are transmitted by the infrared transmitter 17 in the converter, in the form of infrared beams to the infrared receiver 19 at the terminal 6 causing the display 20 to indicate the item concerned. This enables the person using the reading pen 3 to check that the signals transmitted have reached the control centre and also provides the possibility of checking the accuracy of data transmitted.

The terminal 6 features a number of keys 22, which when pressed cause special signals to be transmitted via the infrared beam to the control centre 13. Thus for instance, by pressing the appropriate key, an error signal can be transmitted, if an error is recognized in the display 20.

There is also the possibility of giving the instruction by pressing other keys 22 of the terminal to display the price of the item at the terminal 6. In this case the immediately preceding characters in the display 20 are cancelled and replaced by the price. However other information of interest can also be retrieved by pressing the appropriate key, e.g. the location at which the item is stored or at which the item reaching the goods inwards department is to be stored. Further information on remaining available stocks of these items can also be requested or accessed.

The control centre 13 can be linked to several other converters 11A, 11B usually of similar design, which are connected with the converter 11 or the control centre 13 by suitable connecting cables. These further converters, e.g. the converter 11A shown in the FIGURE, operate in conjunction with other terminals 6A etc. which are usually of the same design as the terminal 6.

It is also possible for one converter to work with several terminals or for one terminal to work with different converters—depending on the layout of the premises.

In order to ensure smooth operation of the control centre 13 with several terminals 6, 6A, 6B, the control centre transmits a succession of information retrieval signals to the individual terminals at predetermined short intervals of e.g. 50 msec,.these of course incorporating a corresponding address. These information retrieval signals can either be transmitted to all terminals at equal intervals or else preferentially to individual terminals.

On receipt of an information retrieval signal by the terminal corresponding to the address, the signal to be transmitted from the terminal to the control centre is started or released for transmission. The signal can either be the signal obtained from scanning the bar code 2 which marks the item or it can be a special signal which is given by operating one of the keys 22.

Immediately after transmitting an information retrieval signal, the control centre 13 is placed in the receiving mode for a predetermined time, e.g. for 20 msec, for the signal to be transmitted by the terminal concerned to the control centre.

For particular purposes, e.g. for monitoring purposes it is also possible to incorporate further terminals, as indicated in the FIGURE by the terminal 6B, which apart from the infrared transmitter 7B and the infrared receiver 19 are equipped only with a display 20. Special features can also be incorporated within the processor 14 and/or the memory 15, which give a warning signal when the stocks of goods decrease beyond a predetermined minimum level. Further special features in the processor 14 and/or memory 15 can be provided, which continiously add and record the sum of the individual prices for the goods released and which display the last stored value in a separate display on receipt of a special signal.

The system according to the invention offers the important advantage in practical use, that the reading pen 3 can be made very light and easy to use, as the electronic circuitry required for processing the signals is housed in separate units. These separate units, in particular the converter 11, the control centre 13, the processor 14 and the memory 15 are usually in a fixed location and there is practically no danger of damage to the electronic equipment they contain, while the electronic circuitry incorporated in the reading pens in existing systems is much more liable to damage, for instance if the reading pen is dropped.

The system according to the invention further offers the considerable advantage that the important electronic components can be operated in conjunction with several reading pens 3A, identical to the reading pen 3, so that in a large system with several reading pens, less equipment is required. Because the reading pen and infrared transmitter are separate, the reading pen can be moved more freely in different directions without disturbing the infrared transmission to the converter. Because of the separation of the reading pen from the display 20 and the keys 22, the system according to the invention is equally easy to use for right-handed as well as left-handed operators, so that either right- or left-handed personnel can be employed.

We claim:

1. System for monitoring the movement of goods inwards and/or outwards using a reading pen for scanning a marking such as a bar code characterizing an item of goods and transmitting first electrical signals corresponding to the bar code, comprising in combination at least one portable terminal for processing the first electrical signals and also showing data corresponding to the electrical signals in a display for checking purposes, said terminal being positioned descretely from said reading pen and connected to said reading pen by connecting wires, a control centre with a memory, said terminal incorporating an integrated infrared transmitter in which the first electrical signals are modulated onto a carrier wave and transmitted as infrared signals, at least one converter with an infrared receiver adapted for converting the infrared signals into second electrical signals and including means for transmitting said second electrical signals to the control centre via connecting wires, means for returning said second electrical signals via connecting wires to the converter and from there via an infrared beam to the display of the terminal, means for storing said second electrical signals in areas of the memory reserved for the code of said item, keys being provided at the terminal which when pressed give special signals via the infrared beam and the converter to said control centre, so that upon information (e.g. price of the item, storage location, stock level) relating to the last code read, being stored in the memory is transmitted as additional signals via the infrared beam and the converter to the terminal where it is displayed, and means to send from the control centre repeated information retrieval signals to the terminal upon which it is in the receiving mode for the signals sent by the terminal concerned via the infrared beam concerned for a time of a fraction of a second in each case.

2. System according to claim 1, characterized in that the control centre gives a warning signal when stocks of an item fall below a minimum level.

3. System according to claim 1, characterized in that the control centre also sends the information retrieval signal to an additional terminal for the purpose of showing data in a display.

* * * * *